May 23, 1950 S. E. RICHESON ET AL 2,509,075
PRESSURE COOKER
Filed Aug. 22, 1946
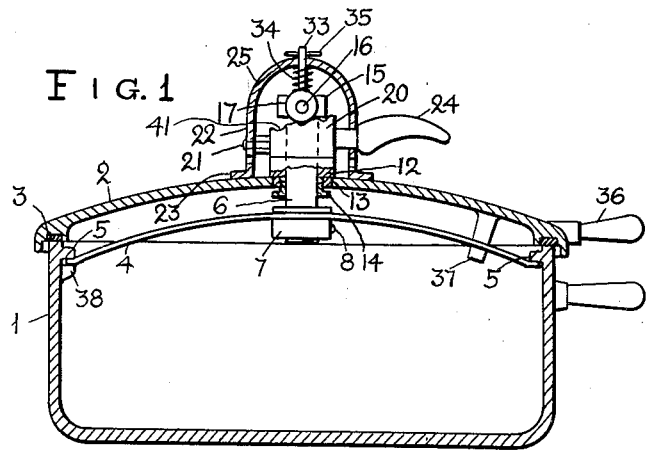
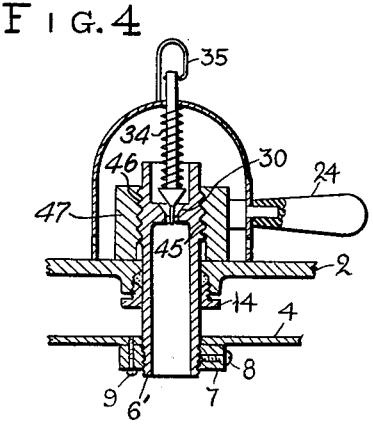
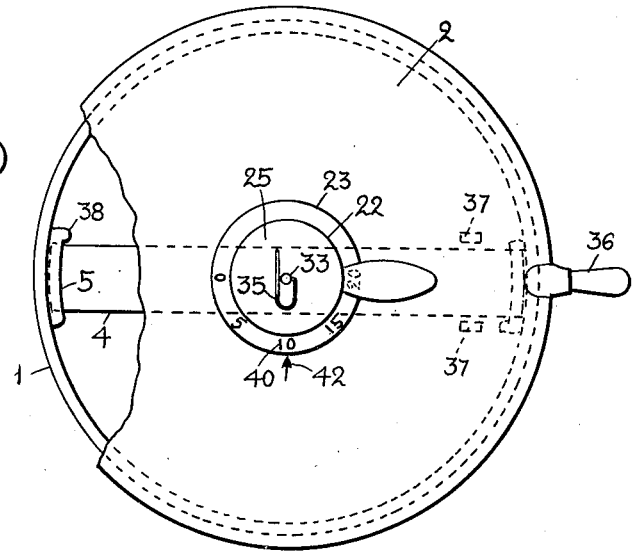
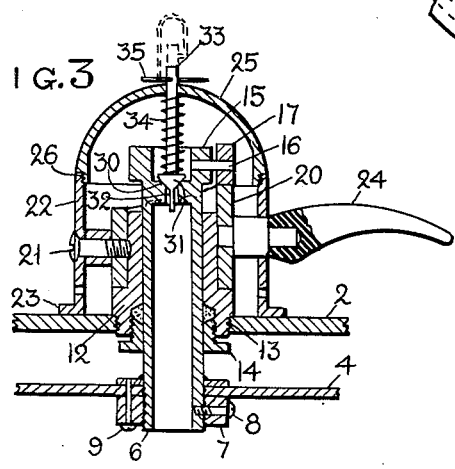
SANFORD E. RICHESON
JOSEPH A. ALLEGRO
INVENTORS
BY John P. Mironow
ATTORNEY Patented May 23, 1950

2,509,075

UNITED STATES PATENT OFFICE 2,509,075

PRESSURE COOKER

Sanford E. Richeson, Brooklyn, and Joseph A. Allegro, Maspeth, N. Y., assignors of one-third to Louis C. Huber, Ridgewood, N. J.

Application August 22, 1946, Serial No. 692,232

7 Claims. (Cl. 220—57)

Our invention relates to pressure cookers and has particular reference to vessels for cooking food under pressure, and more particularly to safety devices for such cookers.

Conventional pressure cookers are usually provided with safety valves which are opened when vapor pressure in the cookers exceeds a predetermined or selected limit. Such valves usually have a disadvantage in that they can be easily clogged by solid food particles in the cooker in which case the pressure may rise to a dangerous value; also that the suddenly escaping jets of hot vapors can scald the face and hands of an attendant.

Our invention has for its object to overcome the foregoing disadvantages by providing a safety means which permits lifting of the lid of the cooker at a predetermined pressure, thereby allowing the vapors to escape over a wide area so that they do not form any strong and dangerous jets. We also provide means to direct the escaping vapors downward so that they cannot reach the face and hands of the attendant.

Another object of our invention is to provide a simple and effective means to clamp the lid on the cooker and to remove the lid when desired, the clamping means also constituting a part of the foregoing safety device.

Another object of our invention is to provide means to regulate the clamping pressure on the lid so as to adjust the safety feature for opening the lid when a selected vapor pressure is reached thereby releasing the vapors in the cooker when a predetermined pressure is reached, means being provided to direct the vapors downward and away from the face and hands of the attendant.

Another object of our invention is to provide a supplementary safety device for releasing the vapor pressure at a somewhat increased pressure in the event the safety valve becomes clogged by food particles or otherwise inoperative. We provide for this purpose by an arrangement for releasing the lid of the cooker.

Another object of our invention is to provide means to simultaneously adjust the pressure of the safety valve and of the safety device so that the safety device opens the lid at a vapor pressure depending on the pressure to which the safety valve is adjusted.

Still another object of our invention is to provide a pressure cooker of a simple, reliable and attractive construction, simple to operate and safe in its operation.

The foregoing and other objects, features and advantages are more fully described in the accompanying specification and drawing in which:

Fig. 1 is a sectional elevational view of our cooker with our safety valve and supplementary safety device;

Fig. 2 is a top plan view of the same partly in section; and

Fig. 3 is a sectional elevational view of our valve shown on a larger scale.

Fig. 4 is a similar view of a modified valve.

Our pressure cooker consists of a vessel pan 1 with a cover or lid 2. The latter is provided with a gasket 3 placed in a corresponding groove and made of rubber or similar elastic material. The lid 2 is held in place by a resilient bar 4 whose ends engage inward extending lugs 5 on the walls of the pan 1. A hollow stem 6 is threaded into a central hole in the spring bar and is held in place by a nut 7 screwed on the end of the stem, the nut being locked by a set screw 8 and further secured to the steel bar 4 by a pin 9 as shown more clearly in Fig. 3. The hollow stem 6 is slidably fitted in a tubular post 12 whose lower end is threaded at 13 into the lid 2 and is provided with a packing gland 14 for sealing the stem while allowing for a relative sliding movement. The upper end of the stem 6 is provided with an enlargement 15 supporting a stub shaft 16 for a roller 17. The latter rests on the upper edge of a sleeve 20 rotatively mounted on the upper portion of the tubular post 12. The upper edge of the sleeve 20 is spirally shaped or is inclined so that the position of the stem 6 in the post 12 can be changed by rotating the sleeve 20. The latter is secured by a screw 21 to the wall of a tubular casing 22 having a flange 23 at the bottom resting on the lid 2 of the cooker. A handle 24 is secured to the sleeve 20 and the casing 22 for manual rotation of the sleeve with the casing thereby changing the tension of the spring bar 4. A dome-shaped cap 25 is threaded on the upper edge of the casing 22 at 26.

A valve seat 30 is provided in the upper portion of the stem 6 for a valve 31. The latter has an extension in the form of a thin pin 32 passing with a clearance through the opening in the valve seat for cleaning the opening from any obstructions such as may be caused by solid food particles in the cooker. A stem 33 extends upward from the valve and slidably passes through a corresponding opening in the dome 25. A spring 34 on the stem 33 urges the valve against its seat. A locking device for the valve is provided in the form of a wire hook 35 rotatively mounted in a hole in the upper end of the valve stem 33. By turning the hook into a vertical position as shown in dotted lines in Fig. 3, or in full lines in Fig. 4, the valve is held locked in a raised position when it is desired to cook at atmospheric pressure. The handle 24 should be then turned to the position in which the stem 33 is in its lowest position.

The lid 2 is provided with a short handle 36 for turning the cover into a position in which the ends of the spring bar 4 engage the lugs 5. The bar 4 is retained in its place by lugs 37 extending from the lid 2.

For closing the lid, the handle 24 is turned into a position in which the stem 6 is in a position in which the ends of the spring bar 4 can be moved under the lugs 5 until the ends of the bar 4 come to rest against downward extending projections or lugs 38 at the ends of the lugs 5. The lugs 5 may have a tapering or inclined shape to facilitate sliding of the bar 4 into its operative position. For removing the lid 2, it is rotated in the opposite directon until the bar 4 clears the lugs 5.

It may be noted that the pressure of the valve spring 34 is varied by the raising or lowering the hollow stem 6 as caused by the rotation of the sleeve 20. For adjusting the valve to maintain a desired vapor pressure in the cookers, scale divisions 40 are provided on the flange 23 calibrated in pounds per square inch for each position of the sleeve 20 and casing 22 relative to a stationary mark 42 on the lid 2, usually for 5, 10, 15 and 20 lbs. The upper edge of the sleeve 20 is provided with recesses 41 corresponding to the marks 40 for yieldably retaining the sleeve 20 in a slanted position.

Of course, the scale may be provided on the lid 2 around the casing with reference to a mark on the flange 23.

The tension of the spring bar 4 is so proportioned that a lid 2 is raised by the vapor pressure exceeding by a certain percentage, the pressure for which the safety valve 31 is set. Hence for every setting of the valve 31 the spring bar 4 is also set to open the lid 2 at a correspondingly increased vapor pressure.

Fig. 4 shows a modified arrangement in which stem 6 of Fig. 3 is replaced by a stem 6' having an external thread 45. This thread is engaged by the internal thread 46 of a screw member 47 resting upon lid 2. Screw member 47 can be turned by means of handle 24.

As will be apparent, rotation of handle 24 will adjust the tension of spring bar 4 and also of valve spring 34 in a manner similar to the one described in connection with Fig. 3.

It will be understood that various features and principles of each of the embodiments of the invention above described or referred to may be utilized or substituted in the other embodiments.

While the invention has been described in detail with respect to certain particular preferred examples, it will be understood by those skilled in the art after understanding the invention, that various changes and further modifications may be made without departing from the spirit and scope of the invention, and it is intended therefore in the appended claims to cover all such changes and modifications.

The following is claimed as new:

1. An adjustable lid fastening arrangement for pressure cookers of the type including a vessel, a lid resting upon the rim of the vessel, a spring bar for releasably holding the lid against the rim, and a safety valve interposed between the lid and the spring bar, said arrangement comprising a tubular valve base supported on the lid, a tubular member including a valve seat at one end and secured to the spring bar on the other end, said valve member being mounted axially slidably within the valve base, a valve arranged to be seated upon the valve seat, a spring yieldably biasing the valve against the valve seat, and adjustment means for varying the axial position of the valve member within the valve base and relative to the lid, thereby adjusting the tension of the spring bar and of the valve spring.

2. A fastening arrangement as described in claim 1, wherein one end of the valve spring abuts against a body secured to the lid, thereby causing simultaneous adjustment of the bar tension and the spring tension in response to an adjustment of the valve member position.

3. A fastening arrangement as described in claim 2, wherein said body comprises a cap placed over said valve base and said valve member and resting upon the lid.

4. A fastening arrangement as described in claim 1, in combination with lugs extending inwardly from the wall of the vessel near the rim thereof, and wherein said spring bar is disposed within the vessel below said lid.

5. An adjustable lid fastening arrangement for pressure cookers of the type including a vessel, a lid resting upon the rim of the vessel, a spring bar for releasably holding the lid against the rim, and a safety valve interposed between the lid and the spring bar, said arrangement comprising a tubular valve base supported on the lid, a tubular member including a valve seat at one end and secured to the spring bar on the other end, said valve member being mounted axially slidably within the valve base, a valve arranged to be seated upon the valve seat, a spring yieldably biasing the valve against the valve seat, a sleeve rotatably mounted on the valve base, said sleeve having an edge slanted in circumferential direction, a sliding member extending from the valve member and riding upon said slanted edge, and actuating means for rotating the sleeve relative to the valve member, thereby varying the axial position of the valve member within the valve base for adjusting the tension of the spring bar and the valve spring.

6. A fastening arrangement as described in claim 5, in combination with a cap placed over said valve base and said valve member and resting upon the lid, said valve spring abutting at one end against the valve and at the other end against the inner wall of the cap.

7. An adjustable lid fastening arrangement for pressure cookers of the type including a vessel, a lid resting upon the rim of the vessel, a spring bar for releasably holding the lid against the rim, and a safety valve interposed between the lid and the spring bar, said arrangement comprising a tubular valve base rotatably supported on the lid, a tubular member including a valve seat at one end and secured to the spring bar on the other end, said valve member being mounted axially slidably within the valve base, a valve arranged to be seated upon the valve seat, a spring yieldably biasing the valve against the valve seat, said valve base having an internal thread and said valve member having an external thread engaging said internal thread, and actuating means for rotating the base member relative to the valve member for varying the axial position of the valve member relative to the base member, thereby adjusting the tension of the spring bar and the valve spring.

SANFORD E. RICHESON.
JOSEPH A. ALLEGRO.

REFERENCES CITED

The following references are of record in the file of this patent:

UNITED STATES PATENTS

| Number | Name | Date |
| --- | --- | --- |
| 1,189,173 | Petersen | June 27, 1916 |
| 1,273,347 | Ferris | July 23, 1918 |
| 1,784,198 | Persson | Dec. 9, 1930 |
| 1,844,970 | Muller et al. | Feb. 16, 1932 |